(12) United States Patent
Yamada et al.

(10) Patent No.: US 6,738,352 B1
(45) Date of Patent: May 18, 2004

(54) TRANSFER DESTINATION DETERMINING PROCESS APPARATUS

(75) Inventors: Kenshin Yamada, Tokyo (JP); Michio Masuda, Tokyo (JP); Motoo Nishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/511,773

(22) Filed: Feb. 24, 2000

(30) Foreign Application Priority Data

Feb. 26, 1999 (JP) .......................................... 11/050057

(51) Int. Cl.[7] .......................... H04L 12/26; H04L 12/28
(52) U.S. Cl. ......................................... 370/238; 370/392
(58) Field of Search ................................ 370/235, 238, 370/389, 392, 395.3, 400, 409

(56) References Cited

U.S. PATENT DOCUMENTS

| 6,243,667 | B1 | * | 6/2001 | Kerr et al. ..................... 703/27 |
| 6,347,078 | B1 | * | 2/2002 | Narvaez-Guarnieri et al. ..................... 370/230 |
| 6,510,135 | B1 | * | 1/2003 | Almulhem et al. ......... 370/229 |
| 6,510,164 | B1 | * | 1/2003 | Ramaswamy et al. ...... 370/466 |
| 2001/0007557 | A1 | | 7/2001 | Yamada et al. |

FOREIGN PATENT DOCUMENTS

JP          10-198642          7/1998

* cited by examiner

Primary Examiner—Hassan Kizou
Assistant Examiner—Timothy Lee
(74) Attorney, Agent, or Firm—Sughrue Mion, PLLC

(57) ABSTRACT

A transfer destination determining apparatus and method performing a load distribution in a network, where a plurality of transfer destination subjects are present as a transfer destination of a datagram, while the same collected flows are transferred to the same transfer destinations, the transfer destinations are allocated with respect to each of the collected flows. This apparatus has an extracting part extracting address and flow discrimination information, in the IP datagram; route solving part determining a transfer path based on the address information. When the determined path is a single path, the transfer destination is uniquely determined and the path is outputted to a post-staged apparatus, whereas when the path is a multi-path having a plurality of transfer destination subjects a multi-path number is outputted to a flow managing means which determines a transfer path corresponding, to a collected flow based on the received flow discrimination information and the multi-path number.

11 Claims, 14 Drawing Sheets

Ipv6 HEADER FORMAT

FIG.7

| ADDRESS PORTION | | DATA PORTION |
|---|---|---|
| MULTI-PATH NUMBER | LOWER-GRADED BIT OF FLOW LABEL | TRANSFER PATH |
| 1 | 00 | PATH 1-1 |
| | 01 | PATH 1-2 |
| | 02 | PATH 1-2 |
| | 03 | NONE |
| | ⋮ | ⋮ |
| | FF | NONE |
| 2 | 00 | PATH 2-1 |
| 2 | 01 | PATH 2-3 |
| 2 | 02 | PATH 2-3 |

| ADDRESS PORTION | | DATA PORTION |
| --- | --- | --- |
| MULTI-PATH NUMBER | LOWER-GRADED BIT OF FLOW LABEL | TRANSFER PATH |
| 1 | 00 | PATH 1-1 |
| | 01 | PATH 1-1 |
| | 02 | PATH 1-2 |
| | 03 | PATH 1-1 |
| | 04 | PATH 1-1 |
| | 05 | PATH 1-2 |
| | ⋮ | ⋮ |
| | FF | PATH 1-1 |
| 2 | 00 | PATH 2-1 |
| | 01 | PATH 2-3 |
| | 02 | PATH 2-3 |

REGISTER TRANSFER PATH INTO ALL OF DATA PORTIONS IN CONNECTION WITH SET VALUE REQUIRED FOR EACH OF MULTI-PATH NUMBERS

| SERVICE IDENTIFIER | CLIENT IDENTIFIER | | TRANSFER DESTINATION BEP NODE IDENTIFIER |
|---|---|---|---|
| DESTINATION PORT NUMBER | SOURCE IP ADDRESS | SOURCE PORT NUMBER | DESTINATION IP ADDRESS |
| 8080 | IP-CL1 | PORT-CL1-**1 | IP-A |
|  | IP-CL1 | PORT-CL1-**2 | IP-B |
|  | IP-CL2 | PORT-CL2-**1 | IP-A |
|  | IP-CL3 | PORT-CL3-**1 | IP-B |
| 8081 | IP-CL4 | PORT-CL4-**1 | IP-C |
|  | IP-CL5 | PORT-CL5-**1 | IP-D |
|  | IP-CL4 | PORT-CL6-**1 | IP-C |
| ⋮ | ⋮ | ⋮ | ⋮ |

TRANSFER DESTINATION DETERMINING PROCESS APPARATUS

BACKGROUND OF THE INVENTION

1. Field of the Invention

The present invention generally relates to a communication apparatus of a network. More specifically, the present invention relates to a transfer destination determining process apparatus for selecting an optimum transfer path where a plurality of datagram transfer paths are provided.

2. Description of the Related Art

Conventionally, apparatuses for connecting plural networks to each other, such as LANs to repeat datagram data, bridges and routers are known in this field.

The bridge apparatus connect these plural networks in the data link layer (especially, media access sub-layer: MAC) in the open system interconnection (OSI) reference model ruled in the International Organization for Standard (ISO). And the router apparatus connect these plural networks to each other in the network layer corresponding to the upper grade layer as to the data link layer.

Currently, since the Internet is popularized, strong demands are rapidly made so as to perform the Internet communications in more broad-range networks.

FIG. 12 is a block diagram for indicating a structural example of a broad-range Internet network.

The broad-range Internet network shown in FIG. 12 is arranged by a large number of enterprise-used LANs as subscriber networks, provider networks, and a core network. This core network is used to connect these networks to each other in order to transfer IP datagrams sent from users to destinations over medium/long distances.

The core network shown in this drawing is operated by mainly a large-scaled public communication industry (carrier) and so on. This core network constitutes a major portion of the Internet in such a broad-range network and carrying Internet traffics concentrated from domestic/foreign regions and connecting enterprise-used networks and provider networks.

Then, an edge apparatus is located at a relay point to connect an enterprise-used network, or a provider network with the core network and is arranged at an input/output part with respect to the core network.

The core network is constituted by a plurality of communication apparatuses, for instance, a high speed router, or an ATM switching apparatus (ATM-SW) when an ATM transfer operation is employed.

Also, in a core network a data communication is executed that when a IP datagram is received, a communication path from an edge apparatus of a data source to an edge apparatus of a data destination is determined, and the data is transferred by each repeating communication apparatus to a proper transfer destination.

In a repeating communication apparatus, it is required to judge a transfer destination for each received datagram via a network to transfer based upon routing table information for determining a transfer destination, which is previously provided in the apparatus.

In general, this judging process operation is executed based upon an address indicated by an address field contained in the reception datagram data.

For instance, in a router, a judgment is made with reference to a destination IP address of received datagram.

Conventionally, a transfer destination with respect to a destination IP address is uniquely determined.

However, it may be expected in the near future, in order to provide high graded services, plural paths in which datagrams are transferred are provided, and a transfer path is selected depending upon a load of a network in each of network appliances.

Then, a desirable transfer destination must be flexibly determined without being concentrated to a specific route provided in a network in order to equalize traffics.

Also, in a conventional client/server system containing a plurality of servers capable of executing actual process operations in response to requests issued form clients, such a load distributing apparatus has been proposed. That is, this load distributing apparatus is arranged at a pre-stage of these servers, and distributes the requests issued from the clients in accordance with loads of the servers to be transferred. As one of such load distributing systems, Japanese Laid-open Patent Application No. Hei-10-19862 discloses the server apparatus. Referring now to drawings, this conventional technique will be explained.

FIG. 14 is an explanatory diagram of a client/server system used to explain the conventional technique.

FIG. 14A represents a server arrangement constituted by a front-end server (FEP), and also a plurality of back-end servers (BEPs). The front-end server receives a request issued from a client, and distributes the received request to a plurality of servers provided at a post stage thereof. The plural back-end servers (BEP) perform actual process operations in response to the request sent from the client. The above-explained FEP server determines a transfer destination node of the request in accordance with a sort of requested service, and transfers the request to a properly determined BEP, taking account of a load distribution.

In this case, a flow of an IP datagram will be referred to as a "flow". The respective flows are discriminated from each other based upon a transmission source, a transmission destination IP (Internet protocol) address, a protocol, a TCP/UDP port number, and the like.

Then, when a desirable transfer destination is determined, this client/server system is controlled in such a manner that this desirable transfer destination can be uniquely determined in the unit of such a flow by registering/managing the BEP node identifier information equal to the transfer destination with respect to the transmission source IP address and the transmission source port number within an IP header, which is such information used to uniquely discriminate the flow in the IPv4 datagram.

FIG. 14B indicates an allocated transfer route list on which transfer routes of requests allocated to the respective clients are recorded. In this list, there are provided a service identifier using a port number as a destination of a request, another service identifier using a source IP address and a port number of a source port, and further a transfer destination BEP node identifier using an IP address of a BEP node in a transfer destination.

Then, when the client sends the request to the FEP server, while using as a key such a pair of the source IP address/source port number which corresponds to the identifier of the request-issuing client and the destination port number of the layer 4, the identifier of the BEP node of the allocated transfer destination is searched by employing the allocated route list. Thus the BEP node of the transfer destination is determined.

In the conventional system described in Japanese Laid-open Patent Application No. Hei-10-198642, since the combination between the transfer destination information and the IP address/port number of the layer 4, which correspond to the information used to uniquely discriminate the desirable flow is registered into the table, the servers of the transfer destinations are allocated, so that the load distribution can be realized.

However, in accordance with this conventional system, the load distribution can be hardly realized in the case that the network routes are allocated in the router of the core network, and/or a total number of clients/servers capable of providing the services is increased.

This is because all of the information about the transfer destinations have been registered into the table, and the transfer destination information corresponds to such information capable of uniquely discriminating the desirable flow. As a result, when a total number of flows to be discriminated is increased, the memory capacity is largely increased. Also, the time duration required to retrieve as to whether or not the transfer destination information has already been registered into the table is increased.

SUMMARY OF THE INVENTION

In accordance with the present invention, in order to perform a load distribution in a network level, when a plurality of transfer destination subjects are present as a transfer destination of a datagram, while the same collected flows are transferred to the same transfer destinations, the transfer destinations are allocated with respect to each of the collected flows, so that a load distribution can be realized.

At this time, even when it may be predicted that a large number of flows are produced as in an apparatus employed in a core network, the present invention has an object to conduct such a system capable of establishing a relative relationship between flows and transfer destinations in a high speed with a small memory capacity so as to realize a load distribution process operation.

While utilizing only a portion of information capable of discriminating a flow contained in a header of a datagram, a transfer destination determining process apparatus according to the present invention determines either a transfer destination or a route (path) to the transfer destination. As a result, this transfer destination determining process apparatus determines the desirable transfer destination with respect to each of the flows.

In other words, in the transfer destination determining process apparatus of the present invention, the transfer destination routes are stored into a table capable of relating the flows to the transfer destination routes with respect to each of the collected flows which are determined by a portion of information capable of discriminating these flows. The necessary memory capacity may be reduced. It should be understood in this specification that a "collected flow" is equal to a set of datagrams having the same qualities, which are transferred to the same edge apparatus. Depending upon operation/management system of a core network, the unit of this flow is set by employing grouping information, for example, a specific user unit, or a communication service level, namely information used to group predetermined collected flows.

For instance, as one concrete setting example, a collected flow may be made of a set of such datagrams having the same qualities and transferred to the same edge apparatus. It should be understood that even when traffics used to transfer datagrams to the same edge apparatus are employed in order to improve the flexibility of traffic controls, such a control is available to allocate these traffics to a plurality of lines by setting a plurality of collected flows.

Concretely speaking, subdivisions of these flows may be set in correspondence with operation policy of a carrier. In general, the following relationship may be established; a total number of flows descriminatable based upon an IP address and a QOS request>a total number of collected flows>same QOS and same edge apparatus.

A transfer destination determining process apparatus, according to the present invention, is featured by comprising:

means for judging as to whether a transfer destination of a received IP datagram is equal to a single path for uniquely setting the transfer destination of said received IP datagram, or a multi-path for determining a proper transfer destination from a plurality of transfer destinations based upon address information of the received IP datagram;

means for determining a transfer destination of a multi-path with respect to this datagram in such a manner that when this transfer destination of the multi-path is determined, a collected flow corresponding to a unit for determining the transfer destination is judged by using a combination with flow discrimination information which reflects QOS information of this datagram; and the transfer destination is determined by referring to a collected flow table for registering/storing paths which should be transferred in response to sorts of these collected flows; and means for determining a transfer destination in such a way that when information corresponding to this collected flow is not yet registered into the collected flow table, setting order of the respective paths and also traffic information are read from a multi-path table which stores therein to all of plural transfer paths for constituting the respective multi-paths; one transfer path is determined from the read information; the datagram is transferred based upon this determined one transfer path and furthermore a transfer path corresponding to this determined collected flow is registered into a collected flow table; and as to collected flows which are subsequently received, transfer destinations thereof are determined with reference to the collected flow table.

BRIEF DESCRIPTION OF THE DRAWINGS

For a better understanding of the present invention, a reference is made of a detailed description to be read in conjunction with the accompanying drawings, in which:

FIG. 7 is an explanatory diagram for explaining a structural example of a collected flow table in the first embodiment of the present invention;

FIG. 11 shows a structural example to a collected flow table in the fourth embodiment of the present invention;

DETAILED DESCRIPTION OF THE PREFERRED EMBODIMENTS

Next, embodiment modes of the present invention will now be described in detail with reference to the drawings.

A datagram transfer apparatus of the present invention is mounted on either an edge apparatus of the Internet network or a communication control apparatus installed in a core network. The datagram transfer apparatus determines a transfer destination of received data, and transmits the received data to the determined transfer destination.

First Datagram Transfer Apparatus

Figure 1:
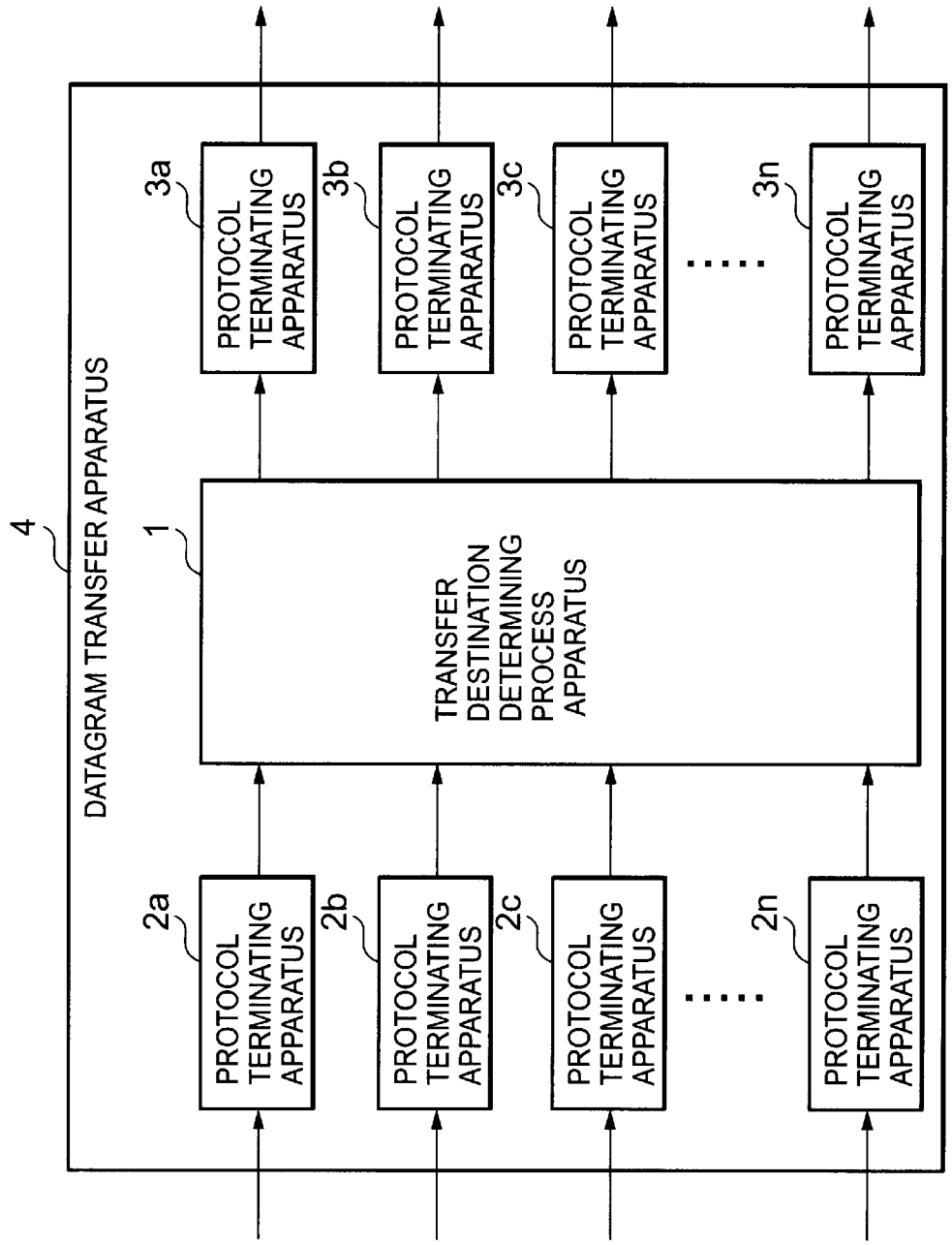
FIG. 1 is a schematic block diagram for showing an arrangement of a datagram transfer apparatus 4 according to a first embodiment of the present invention.

FIG. 1 is a block diagram of an arrangement of a datagram transfer apparatus 4 according to a first embodiment of the present invention.

The datagram transfer apparatus 4 is arranged by a protocol terminating apparatus provided on the reception side, a transfer destination determining process apparatus, and a protocol terminating apparatus provided on the transmission side. The protocol terminating apparatus of the reception end terminates a protocol of a received IP datagram. The transfer destination determining process apparatus determines a transfer destination as to this received IP datagram. The protocol terminating apparatus of the transmission end transmits the IP datagram to the designated transfer destination.

In other words, the datagram transfer apparatus 4 according to this first embodiment is constituted by a plurality of reception-sided protocol terminating apparatuses 2a, 2b, 2c, - - - , 2n; a plurality of transmission-sided protocol terminating apparatuses 3a, 3b, 3c, - - - , 3n; and also a transmission destination determining process apparatus 1 for connecting the respective protocol terminating apparatuses to each other.

Then, the protocol terminating apparatuses 2a, 2b, 2c, - - - , 2n terminate layers such as an IP layer lower than, or equal to a layer 3 with respect to the received datagram, and transfer the datagram to the communication destination determining process apparatus 1.

The transfer destination determining process apparatus 1 determines a desirable transfer destination with reference to a destination address contained in a datagram received from the protocol terminating apparatuses 2a, 2b, 2c, - - - , 2n, and then transfers the received datagram to the corresponding protocol terminating apparatuses 3a, 3b, 3c, - - - , 3n.

In particular, in such a case that a plurality of transfer destination subjects are present, the datagram transfer operation to plural transfer destinations is realized in such a way that a portion of flow discrimination information capable of discriminating a flow contained in a received datagram is made in correspondence with a desirable transfer destination.

When the protocol terminating apparatuses 3a, 3b, 3c, - - - , 3n receive information used to define both a datagram and a transfer destination from the transfer destination determining process apparatus 1, the protocol terminating apparatuses 3a, 3b, 3c, - - - , 3n set a layer lower than, or equal to a layer 3 based upon this information for defining the transfer destination, and transfers this datagram to an external network.

The protocol terminating apparatuses 3a, 3b, 3c, - - - , 3n are logically constituted by a plurality of protocol terminating apparatuses. Alternatively, all of the respective protocol terminating apparatuses, or some of these protocol terminating apparatuses may be constituted by the same hardware circuits.

Concretely speaking, in the case that a layer 2 is equal to an ATM, since a path is established with respect to a virtual destination every VP (Virtual Path), each of these VPs is logically terminated by a single protocol terminating apparatus. It is physically conceivable that an apparatus for terminating a single physical line terminates a plurality of VPs.

Logically speaking, the protocol terminating apparatuses 2a, 2b, 2c, - - - , 2n provided on the reception side, and also the protocol terminating apparatuses 3a, 3b, 3c, - - - , 3n provided on the transmission side own independent functions, i.e., the reception function and the transmission function, respectively. Since the respective protocol terminating apparatuses are physically constituted by the same hardware circuits, these protocol terminating apparatuses may alternatively support bidirectional communications.

Figure 2:
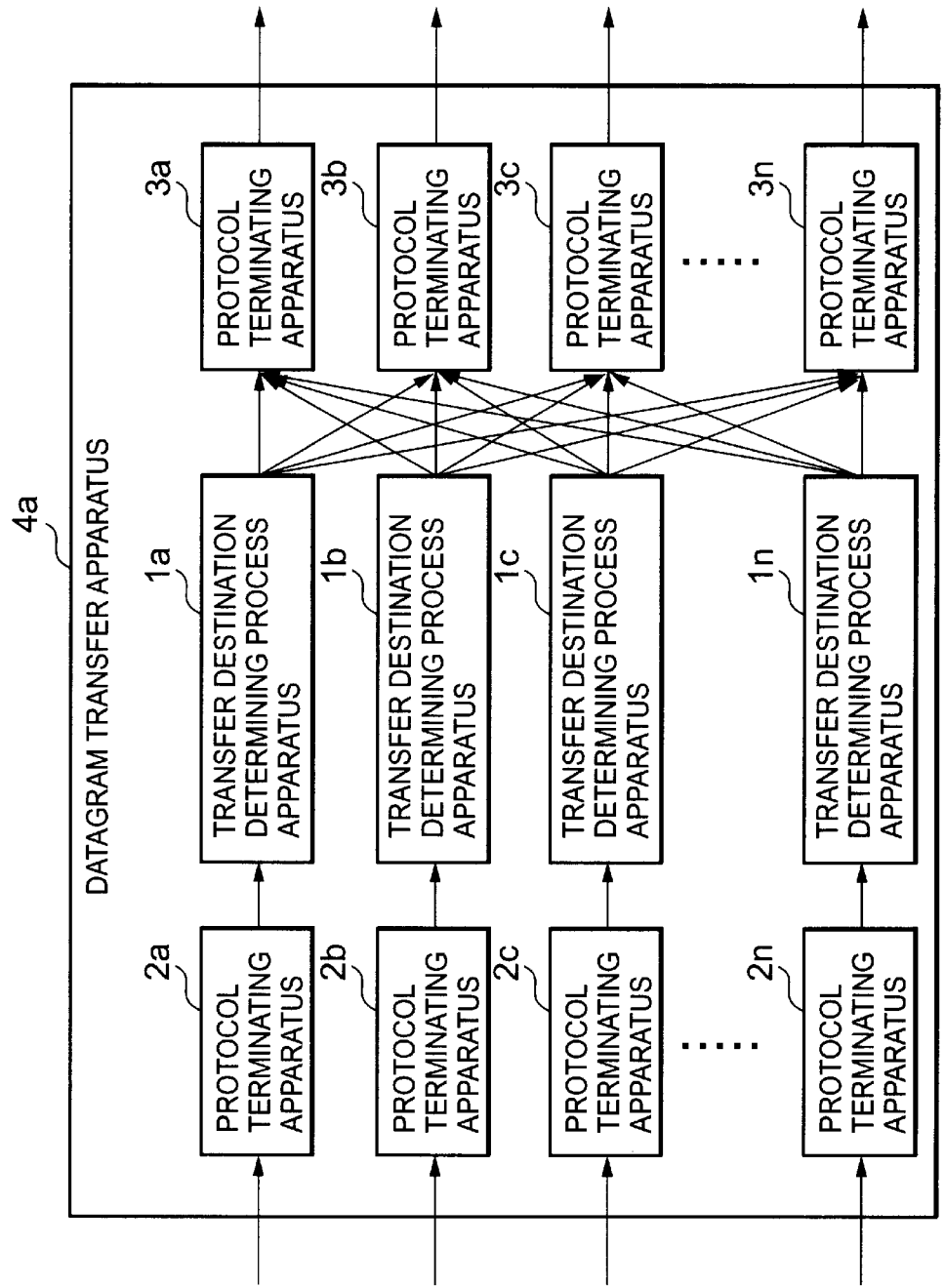
FIG. 2 is a schematic block diagram for indicating an arrangement of a datagram transfer apparatus 4 according to another embodiment of the present invention.

In the embodiment of FIG. 1, the datagram transfer apparatus 4 owns one set of the transfer destination determining process apparatus 1. Alternatively, as shown in FIG. 2, the respective protocol terminating apparatuses 2a, 2b, 2c, 2d may be connected to the exclusively-used transfer destination determining process apparatuses 1 in an one-to-one correspondence.

Figure 3:
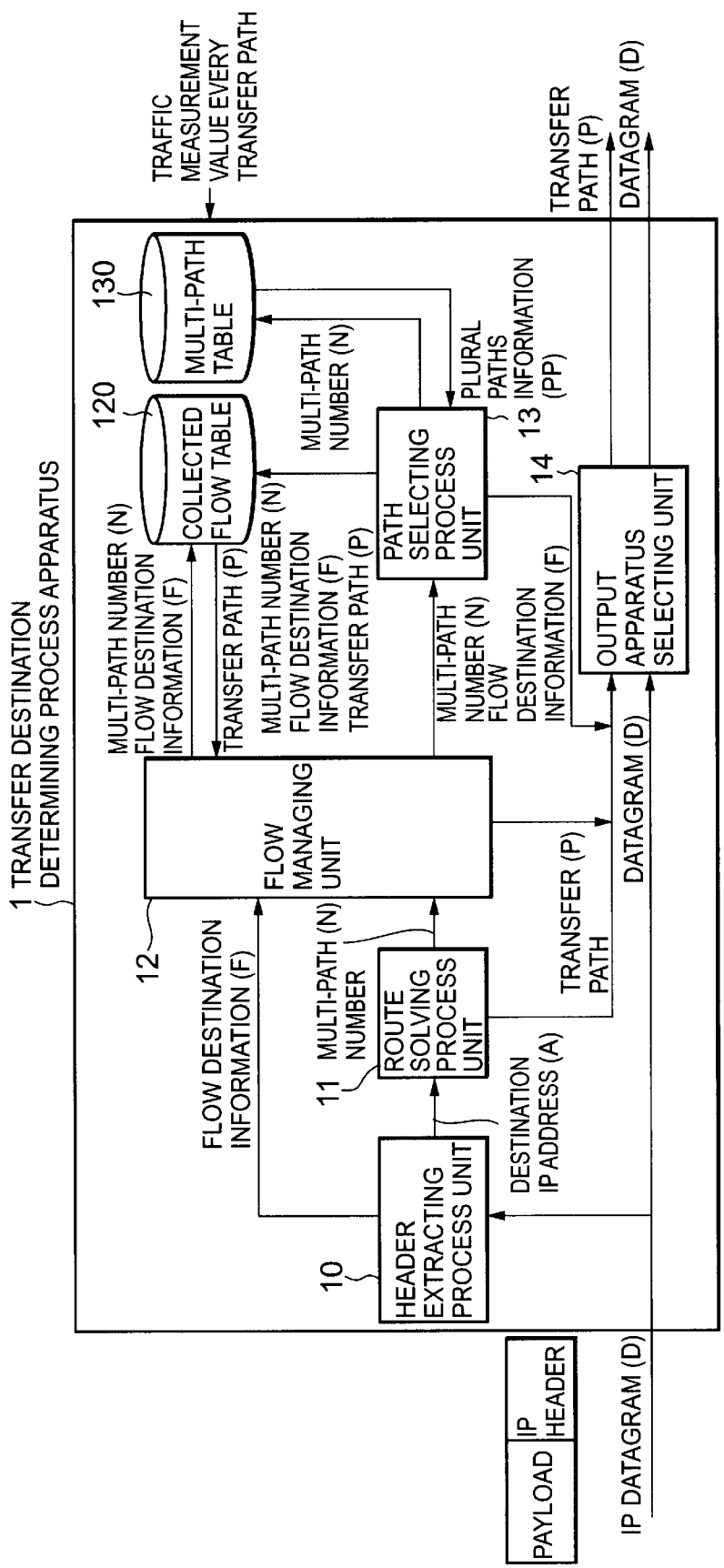
FIG. 3 is a schematic block diagram for illustrating a structural example of a communication destination determining process apparatus according to the first embodiment of the present invention.

FIG. 3 is a block diagram for indicating a structural example of the above-explained transfer destination determining apparatus 1.

The transfer destination determining process apparatus 1 for determining a transfer destination as to a received IP datagram is arranged by a header extracting process unit 10, a route solving process unit 11, a flow managing unit 12, a path selecting process unit 13, an output apparatus selecting unit 14, a collected flow table 120, and a multi-path table 130.

Now, contents of process operations executed in the respective process units will be summarized.

When an IP datagram (D) is entered from any one of these protocol terminating apparatuses 2a, 2b, 2c, - - - , 2n, the header extracting process unit 10 extracts a destination IP address (A) and flow discrimination information (F). The destination IP address (A) is used to determine a transfer path from a header of this datagram (D). The flow discrimination information (F) is used to discriminate a flow.

Then, the destination IP address (A) is outputted to the route solving process unit 11 so as to solve the transfer destination path, and the flow discrimination information (F) is outputted to the flow managing unit (12) in order to discriminate the flow.

It is now assumed that the flow discrimination information (F) for discriminating a flow to be extracted is such flow discrimination information which can be discriminated by a specific bit of a value saved in a flow label field of the header information of the IP datagram (D). All of the flow labels need not be read, but only the portions for saving several bits, which are required to be distributed/transferred, are read out. For instance, in order to avoid such a fact that the IP addresses in the presently available IPv4 are exhausted, in the IPv6 in which the address region is extended to 128 bits, the flow label field for discriminating the flow is owned in the header information (detailed description thereof will be explained later with reference to FIG. 4). In accordance with the present invention, there is no need to extract all of the information saved in the 20-bit field of the flow label used to uniquely the flow in the IPv6 header, but only such information of a preselected partial portion may be extracted which is required to transfer/distribute the datagram to a plurality of paths.

In embodiments of the present invention, a description is made of an IP datagram transfer operation mainly based upon the IPv6 protocol.

In the route solving process unit 11 into which a destination IP address (A) is entered, a transfer destination path is solved by the destination IP address (A), namely where the received datagram is transmitted.

Then, the subsequent process operations are made different from each other, depending upon a single path and a multi-path as the transfer destination path to be solved. That is, in the single path, the transfer destination is uniquely determined. In the multi-path, a plurality of transfer destination subjects are present, and it is required to determine that the received datagram is transferred to which transfer path.

In this case, concepts about such a single path and a multi-path will now be explained with reference to FIG. 13.

Figure 13:
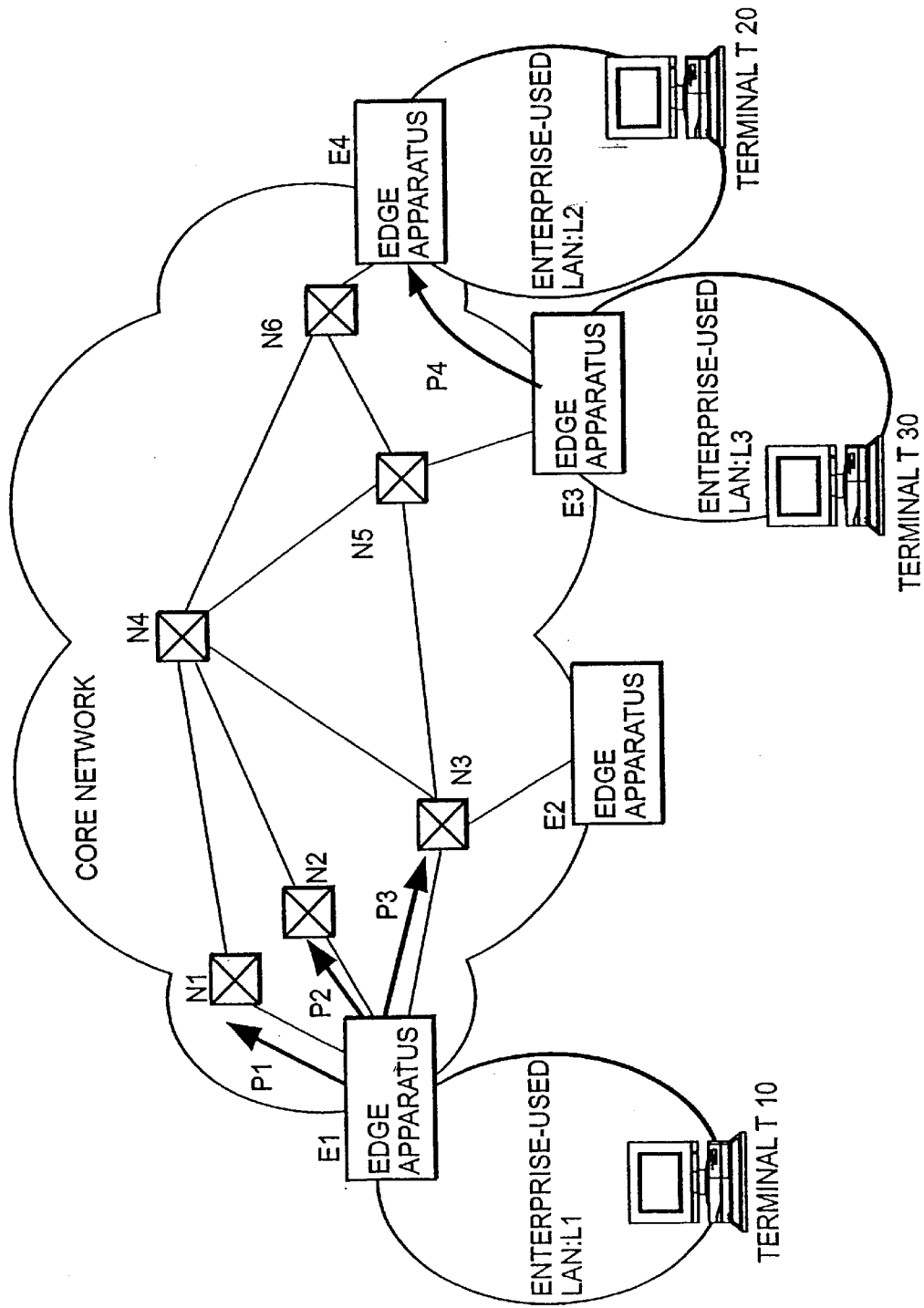
FIG. 13 is an explanatory diagram for explaining a conceptional idea of a single path and also of a multi-path.
Figures 14A, 14B:
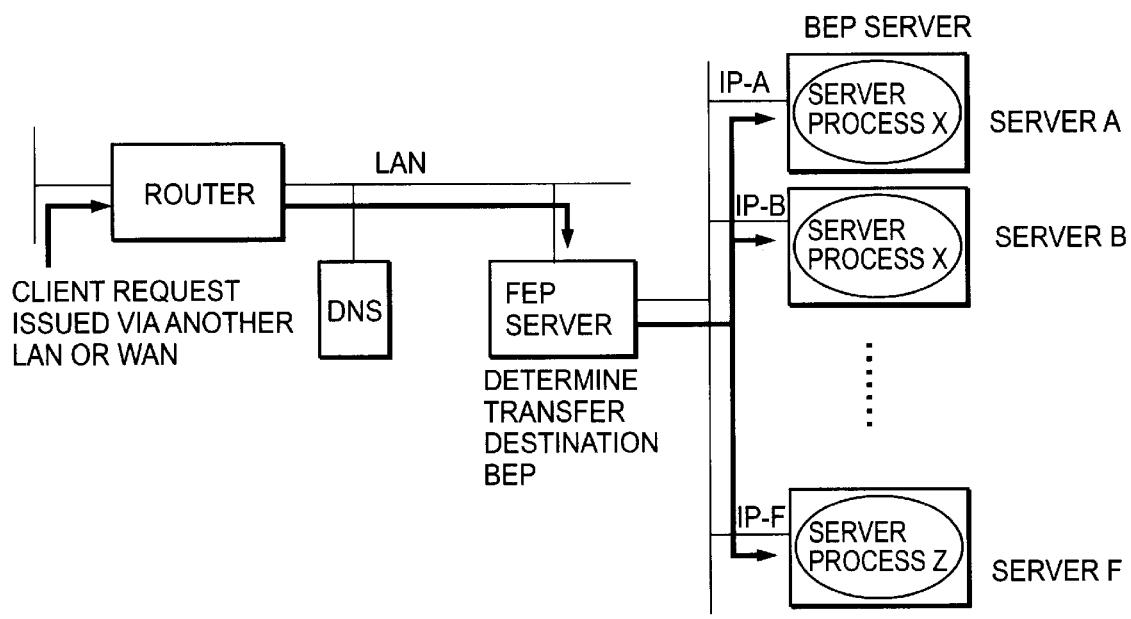
FIG. 14A is an explanatory diagram for explaining the conventional client/server system.
FIG. 14B is an explanatory diagram for explaining the allocated path list in the FEP server in the prior art.

FIG. 13 is an explanatory diagram for explaining the concepts about the single path and the multi-path.

The following case is considered in FIG. 13. That is, the Internet communication is carried out from a terminal T10 belonging to an enterprise-used LAN:L1 which is connected to an edge apparatus E1, to another terminal T20 belonging to another enterprise-used LAN:L2 which is connected to a core network via an edge apparatus E4. Similarly, it is now assumed that an Internet communication may be performed between a terminal T30 belonging to a LAN:L3 and the terminal T20 via another edge apparatus E3 and the edge apparatus E4.

Setting as to whether a single path, or a multi-path is selected is carried out by an operation manager of a core network with respect to, for example, data transferred between specific edge apparatuses. In such a case that since an edge apparatus of a data transfer destination can be specified by a destination IP address contained in an IP datagram, it is possible to discriminate that either the single path or the multi-path is set with reference to the destination IP address. Then, the multi-path is set to the most important line and such a section where an occurrence of congestion is expected.

For example, a more stable data communication service may be provided by setting the multi-path in accordance with the following manner. That is, as to data which is directed from the edge apparatus E1 connected to the LAN L1 to the edge apparatus E4 connected to the LAN L2, while a plurality of transfer destinations are determined as detour paths for distributing traffics, or failure detour paths, the data communication between L1 and L2 is carried by that any one of the plural paths can be selected in response to conditions of the core network.

In a concrete explanation, when the edge apparatus E1 receives the data transmitted from the terminal T10 belonging to the LAN L1, the edge apparatus E1 transmits the data to such a transfer path which is judged as an optimum path by the transfer destination determining process apparatus of the present invention. Also, in N1, N2, N3 corresponding to the repeating apparatus, the data is transferred to a path which is previously determined by this destination, so that the data may be transmitted via the edge apparatus E4 to the terminal T20.

On the other hand, when it is so determined that a datagram is communicated in a single path between the LAN:L3 and the LAN:L2, a transfer destination is uniquely determined.

That is, assuming now that the above-described datagram is always communicated between the LAN:L3 and the LAN:L2 via the edge apparatus E3, the repeating apparatuses N5 and N6, and the edge apparatus E4, the edge apparatus E3 which has received the data from the terminal T30 belonging to the LAN:L3 transmits the data to the repeating apparatus N5 as the transfer destination, and performs the data communication only through a path of P4 indicated in FIG. 13.

As described above, each of the edge apparatuses having the transfer destination determining process apparatus of the present invention can make such a discrimination, namely, each edge apparatus can determine as to whether the data is previously transferred via the single path, or the multi-path in response to a destination IP address of the received data during operation.

In other words, in the transfer destination determining process apparatus, as to the received datagram, whether the received datagram is transferred via the single path or the multi-path every designation IP address may be discriminated by referring to such information previously registered by the operation manager of the network. This method capable of discriminating the single path number and the multi-path number to be transferred from the IP address information maybe realized by the following discriminating method. That is, in the edge apparatus equipped with the transfer destination determining apparatus, both the address information of each user and the transfer path are transmitted via either the single path or the multi-path. Otherwise, while a table for storing thereinto the corresponding information is held, the discrimination is made by referring to the above-described table based upon the address information of the received datagram.

That is to say, while a correspondence list (not shown) is saved in the edge apparatus, the edge apparatus may determine as to whether the received datagram is transferred via the single path, or the multi-path by referring to this correspondence list based upon the destination IP address of the received IP datagram. This correspondence list registers therein such a decision condition as to whether the received datagram is transferred via the single path, or the multi-path with respect to each of the predetermined IP addresses, or the predetermined IP network addresses based upon discrimination information which is previously determined between a user (corresponding to subscriber) and a carrier.

Alternatively, another discriminating method may be used, depending upon the operation thereof. That is, the below-mentioned discrimination information is superimposed on the header information of the IP datagram, and the resultant header information is transmitted from the subscriber. Then, the transfer destination processing apparatus reads this discrimination information used to determine whether or not the received datagram is transferred via the single path, or whether or not the transfer destination is determined as the multi-path.

As previously explained, the route solving process unit 11 employed in the transfer destination determining process apparatus 1 shown in FIG. 3 can make such a judgement between the single path whose transfer destination can be uniquely determined and the multi-path having a plurality of transfer destinations based upon the destination IP address (A). Also, a multi-path number is set to each of the multi-paths. This multi-path number is equal to a discrimination number of a multi-path, which is discriminatable in a core network during operation.

Then, in the route solving process unit 11, when this route solving process unit 11 judges that the transfer destination is the single path based upon the destination IP address (A), since the transfer destination can be uniquely determined, a transfer path (P) corresponding to this destination IP address (A) is outputted to the output apparatus selecting unit 14.

Also, when the path solving process operation unit 11 judges that the transfer destination is the multi-path, since there are plural transfer path subjects, this path solving process operation unit 11 judges which transfer path is used.

Subsequently, a concrete example of the transfer destination determining process operation in the case that the transfer destination of the received datagram (D) is the multi-path will now be described.

When the route solving process unit 11 judges that the transfer destination is the multi-path based upon the destination IP address (A) extracted from the received datagram (D), the route solving process unit 11 extracts the multi-path number (N) and then outputs the extracted multi-path number (N) to the flow managing unit 12. The multi-path number (N) corresponds to information for discriminating the route having the multi-path.

Upon input of the multi-path number (N), the flow managing unit 12 refers to the collected flow table 120 based upon both the flow discrimination information (F) entered from the header extracting process unit 10 and the multi-path number (N) in order to check as to whether or not the transfer path (P) corresponding to a set of the flow discrimination information (F) and the multi-path number (N) is registered.

The collected flow table 120 stores thereinto the transfer paths with respect to the sets of the multi-path numbers (N) and the flow discrimination information (F). If such a transfer path (P) with respect to the set between the flow discrimination information (F) and the multi-path number (N) which are notified from the flow managing unit 12 is stored in this collected flow table 120, then this transfer path (P) is read to be notified to the flow managing unit 12. In the case that the transfer path (P) is notified from the collected flow table 120 to the flow managing unit 12, this flow managing unit 12 can determine and transmit the transfer destination of the received IP datagram by supplying this transfer path (P) to the output apparatus selecting unit 14.

Also, in such a case that the transfer path (P) corresponding to these multi-path number (N) and flow discrimination information (F) is not stored in the collected flow table 120, when this fact is notified from the collected flow table 120, the flow managing unit 12 outputs both the multi-path number (N) and the flow discrimination information (F) to the path selecting process unit 13.

As previously explained, the collected flow table 120 stores thereinto the transfer paths (P) corresponding to both the multi-path numbers (N) and the flow discrimination information (F) When the above-described various information stored in the collected flow table is not read by the flow managing unit for a time period longer than, or equal to a predetermined time period, the stored information is deleted from this collected flow table 120.

As other cases that no corresponding transfer path is stored in the collected flow table 120, the following cases are conceivable. That is, in the initial stage of the network operation, and the extension/change of the facilities, while the data related to the relevant IP datagram is not transferred, the transfer destination information is not yet registered in the collected flow table.

As explained above, in the case that the corresponding transfer path information is not yet stored in the collected flow table 120, when the multi-path number (N) and the flow discrimination information (F) are notified from the flow managing unit 12 to the path selecting process unit 13, this path selecting process unit 13 refers to the multi-path table 130 so as to determine one transfer path (P) among a plurality of paths set as the multi-path number (N), and then outputs the determined transfer path (P) to the output apparatus selecting unit 14.

Also, the path selecting process unit 13 registers this transfer path (P) into the collected flow table 120. This transfer path (P) is determined as a table entry determined by the multi-path number (N) and the flow discrimination information (F). As a result, when such an IP datagram is subsequently received which contains the same address information and flow discrimination information as those of this transfer path (P), the path selecting process unit 13 refers to the collected flow table 120 so as to solve the transfer path.

As explained above, when the output apparatus selecting unit 14 receives both the transfer path (P) and the datagram (D), this output apparatus selecting unit 14 determines the protocol terminating apparatus 3 to which the datagram and the transfer path (P) will be transferred based upon the transfer path (P), and then outputs both the transfer path (P) and the datagram (D) to this determined protocol terminating apparatus 3.

Figure 5:
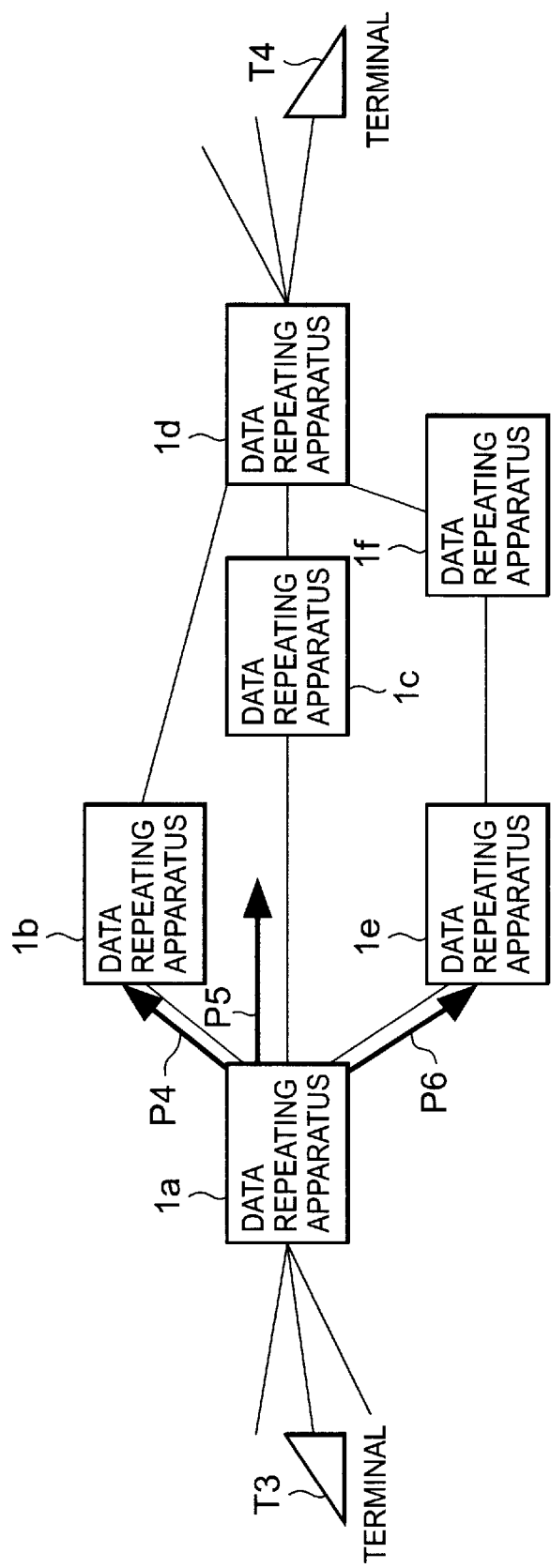
FIG. 5 is an explanatory diagram for explaining an application example to a router network in the first embodiment of the present invention.

Next, FIG. 5 shows an example in which the present invention is applied to an IP network.

FIG. 5 is an explanatory diagram for explaining an application example to a router network in the first embodiment.

The router network is arranged by a plurality of routers (1a, 1b, - - - , 1f corresponding to data repeating apparatuses for transferring IP data from a plurality of terminals (T3, T4, - - - ).

Then, in such a case that the core network of FIG. 5 is an IP network, a transfer path corresponds to an IP address of each of data repeating apparatuses equal to transfer destination subjects, and becomes an MAC address obtained from this IP address. In other words, in the IP network, each of the routers owns a routing table, and also route information for reaching the router to the respective networks. The routing table stores thereinto an IP address of an IP data destination and also IP address information of a repeating apparatus located adjacent to the own repeating apparatus, to which the IP data should be subsequently transferred.

As a consequence, when the present invention is applied to the router network, the transfer path information corresponds to the IP address and the MAC address related to the adjoining data repeating apparatus.

Figure 6:
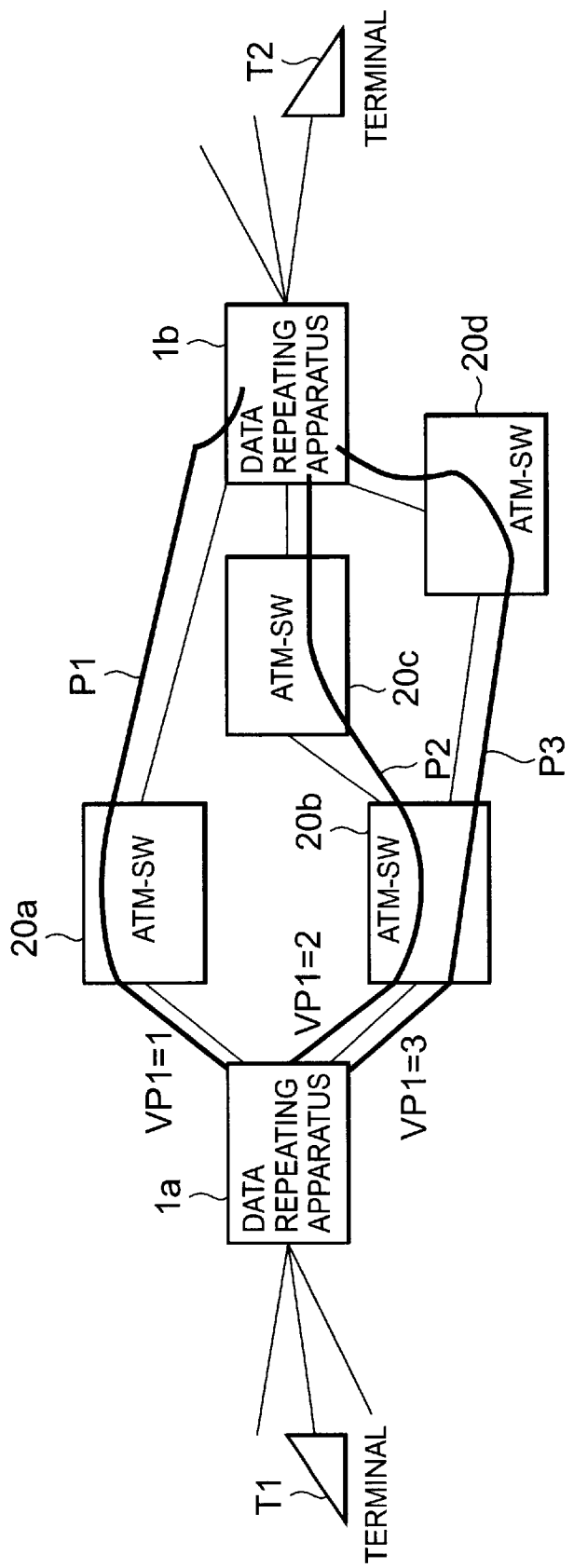
FIG. 6 is an explanatory diagram for explaining an example applied to an IP over ATM network in the first embodiment of the present invention.

Next, FIG. 6 shows an example in which the present invention is applied to an IP over ATM network.

FIG. 6 is an explanatory diagram for explaining an application example to an IP over ATM network in the first embodiment.

An IP over ATM network is such a communication network that an IP datagram is communicated by using an ATM connection set by an ATM address.

The IP over ATM network shown in FIG. 6 is arranged by an IP network provided on the side of a terminal, a data repeating apparatus, and an ATM-SW for constituting an ATM network.

In this case, when the data repeating apparatus connects the IP network to the ATM network and is located at such a position of an edge apparatus which provides an IP over ATM service, a transfer path (P) is equal to either a VP (Virtual Path) or a VC (Virtual Circuit) established between the own data repeating apparatus and a data repeating apparatus to which the transfer path (P) is transferred.

In other words, in the ATM network, since an ATM connection (p1, p2, p3) is set to a route itself defined from a data repeating apparatus (1a) to another data repeating apparatus (1b) shown in FIG. 6, the transfer path information of the present invention in the IP over ATM network corresponds to ATM connection identifier information discriminated by VPI/VCI numbers.

In this case, comparing the application method to the router network shown in FIG. 5 with the application method to the IP over ATM network shown in FIG. 6, the transfer path used in the router network shown in FIG. 5 corresponds to the IP address and the MAC address, which are such information used to define the adjoining data repeating apparatus of the data transfer destination and also the interface thereof, whereas the transfer path used in the IP over ATM network shown in FIG. 6 corresponds to the VP (Virtual Path)/VC (Virtual Circuit) numbers, which are such information used to define the route from the transfer source to the transfer destination.

As previously explained, meanings of the transfer paths (P) are different from each other, depending upon the networks to which the present invention is applied. However, since the present invention performs the load distribution and the traffic congestion control, the present invention may be applied to such an arrangement that a plurality of transfer destination apparatuses, or a plurality of routes to a transfer destination apparatuses are provided in each node.

A more concrete description will now be made of how the content of flow discrimination information (F), a plurality of transfer paths (P), and the flow discrimination information (F) are related to each other in such a case that the layer 3 is the IPv6 in the communication destination determining process apparatus 1 according to the first embodiment.

The IPv6 is such a protocol having a 128-bit IP address field, which may be substituted for the presently available IPv4 protocol (32 bits), and a support for a flow ID in the datagram header is incorporated therein, thereby being used for flow discrimination of a network.

This is similar to such a fact that a VPI/VCI is used so as to recognize a stream of an ATM cell.

Figure 4:
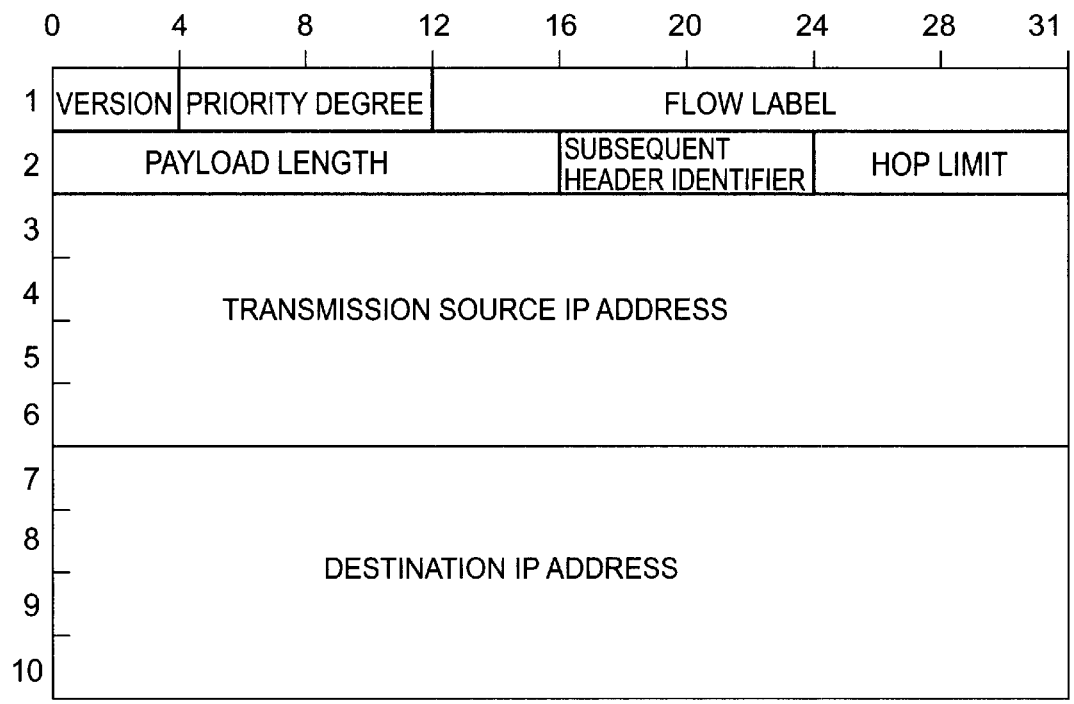
FIG. 4 represents the IPv6 header format.

In FIG. 4, there is shown a format of an IPv6 header.

In the flow label field of the IPv6, the number capable of uniquely discriminating the flow number of the IP is stored.

In a communication apparatus for repeating data within a core network, a desirable flow can be discriminated by both a transmission IP address number of this datagram and the flow label of the IPv6.

This IPv6 may have such a feature that the IP layer flow can be discriminated without referring to the layer 4. To the contrary, in the conventional IPv4 flow, since the flow is discriminated based upon 4 sets of the IP src address, the TCP src port number, the IP dst address, and the TCP dst port number, the flow cannot judged if the TCP layer corresponding to the upper grade layer of the IP is not referred.

Also, in a subsequent header identifier field, there are an extension header of an IP, a TCP, a UDP, and an ICMP, which are employed so as to discriminate that which protocol is loaded on a payload of the IP.

Next, a description will now be made of a concrete example in the case that a datagram of the IPv6 is received.

In the route solving process unit 11 of the transfer destination determining apparatus 1, as a destination IP address (A), a destination IP address (A1) contained in the IPv6 header is utilized so as to solve a transfer destination route.

Then, the header extracting process unit 10 extracts lower-graded 8 bits (F1) of the flow label within the IPv6 header as the flow discrimination information (F). The extracted flow discrimination information (F) is transferred via the flow managing unit 12 to the collected flow table 120.

An example of the collected flow table 120 is indicated in FIG. 7.

FIG. 7 is a structural example of the collected flow table.

The collected flow table 120 is to solve the transfer path (P) from the multi-path number (N) and a specific bit value of a flow label.

Assuming now that the multi-path number is recorded on the upper-graded 8 bits of the address portion, the lower-graded 8-bit information of the flow label is recorded on the lower-graded 8 bits, and also the information of the transfer path (P) is recorded on the data portion, the flow managing unit 12 can simply determine an address to be read out based upon the multi-path number (N) and the lower-graded 8 bits (F1) of the flow label.

Figure 8:
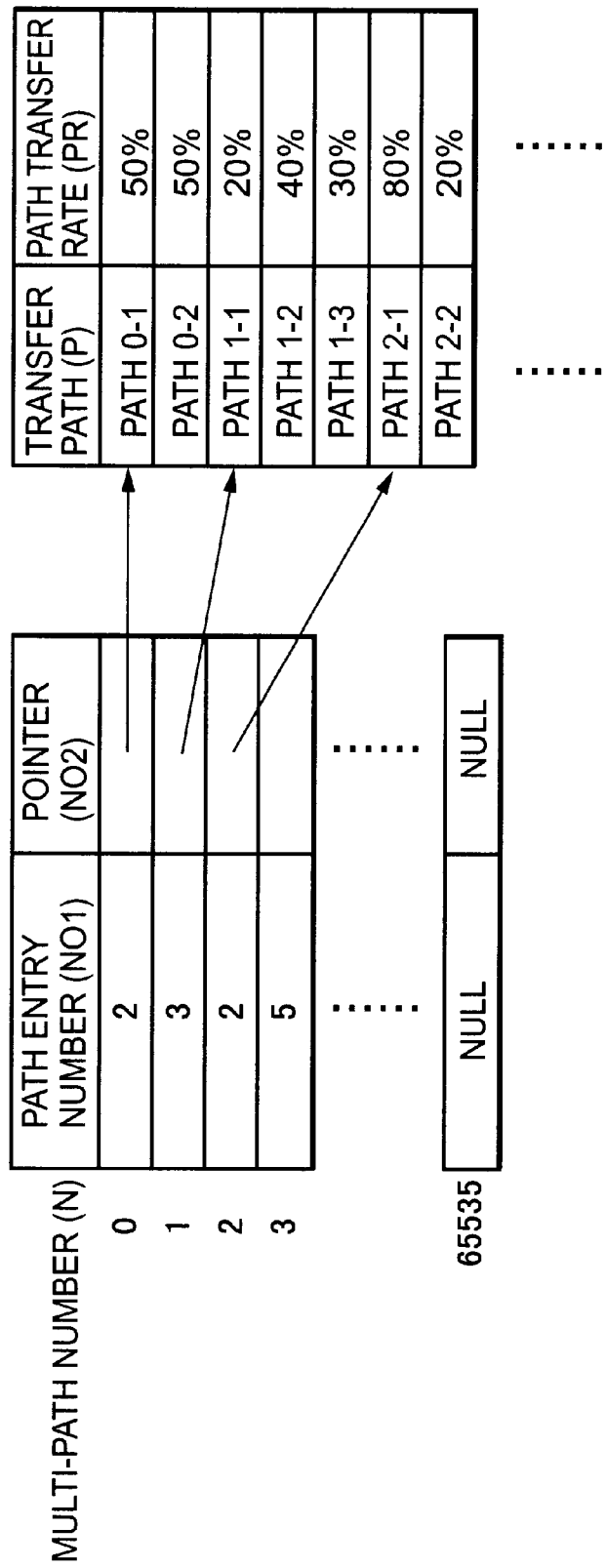
FIG. 8 is a structural example of a multi-path table in the first embodiment of the present invention.

Next, FIG. 8 represents a structural example of a multi-path table.

This multi-path table stores thereinto the multi-path number (N), an entry number (ND1) of a path which is registered as this multi-path, and a pointer (ND2) to actual path information. Then, a plurality of path information equal to the path entry number (ND1) is stored from this pointer (ND2).

The path information is arranged by transfer path information (P) and a path transfer rate (PR). The transfer path information (P) is required when the data is transferred. The path transfer rate (PR) indicates a rate of transferred data every path.

The path selecting process unit 13 selects one transfer path (P) which may be judged as an optimum transfer path based upon the plural path information (PP) equal to a set of the transfer path (P) obtained from the multi-path number (N), and also the path transfer rate (PR).

Next, a description will now be made of an example of a method for selecting a transfer path (P).

The path selecting process unit 13 determines an allocation sequence of paths with respect to each of the multi-path numbers (N).

For instance, when the multi-path number (N) is equal to 1, a path 1-1; a path 1-2, and a path 1-3 are required to be outputted in a ratio of 2:4:3. As a result, for instance, every time the multi-path number (1) is inputted, while a constant setting sequence of the transfer paths is determined, the transfer paths (P) are determined in this order of the path 1-1; the path 1-2; the path 1-3; the path 1-2; the path 1-3; the path 1-1; the path 1-2; the path 1-3; the path 1-2; and the repetition order every time a newly collected flow is received. As a result, the datagram (D) can be transferred in the ratio of 2:4:3.

The various embodiments about the collected flow table and the multi-path table have been described. The flow discrimination information (F) used when the IPv6 is utilized is not always the lower-graded 8 bits of the flow label, but may be the upper-graded 8 bits of the flow label. Alternatively, the flow discrimination information (F) may be such a combination between the lower-graded 4 bits of the transmission source IP address contained in the IP header, and also lower-graded 4 bits of the flow label. Alternatively, this flow discrimination information (F) may be such flow discrimination information obtained by a simple calculation.

Also, as to the bit number of discrimination information, in such a case that the paths are wanted to be more precisely allocated, a total bit number may be increased. Conversely, when the mounting scale of the paths is wanted to be reduced, a total bit number may be reduced.

The datagram transfer apparatus, according to the first embodiment of the present invention, is featured as follows: That is, as the flow discrimination information (F), the collected flow (SF) defined by, for example, a specific bit value (e.g., lower-graded 8 bits) of the flow label is used without using all of the information of the destination IP address 128 bits and also the flow label 20 bits, which corresponds to the information required to uniquely discriminate the flow. Then, the transfer destination is determined every such a collected flow (SF). As a result, the table scale can be reduced and the table retrieve operation can be simplified.

Second Data Transfer Apparatus

A data transfer apparatus 4 according to a second embodiment of the present invention will now be explained.

In this second data transfer apparatus 4, while employing a measurement value obtained by measuring a traffic in which datagram is actually transferred every transfer path (P) by a separately provided traffic measuring means, when a desirable transfer path is determined in the path selecting process unit 13, a selection is made of such a transfer path (P) having the least traffic amount (namely, the largest empty capacity) with respect to traffic capacities required for each of the transfer paths (P).

In this case, it should be noted that concrete traffic measuring means as to transfer paths are different from each other, depending upon applied networks. For example, in each of protocol terminating apparatuses, there is such a method for summing, or totalling IP datagram numbers per unit time, transmitted to each of the transfer paths.

It should also be understood that as to a connection of an ATM network, there is another method capable of grasping a measurement value as to a transfer path. That is, since traffic information of such a traffic path capable of transferring a datagram is required to be acquired with respect to an entire route defined from a certain edge apparatus to an edge apparatus of a datagram transmission source, a managing apparatus for measuring a traffic of an entire route of a core network and the like are separately provided. From this managing apparatus, the traffic information as to the transfer path stored into each of the edge apparatuses is notified to the respective edge apparatuses so as to grasp the measurement value of the transfer path.

The datagram transfer apparatus 4 acquires the traffic information which is measured every time a constant time period has passed as to each of the transfer paths (P) by the above-explained traffic measuring means. Then, instead of the path transfer rate (PR) contained in the multi-path table structure of FIG. 8, the datagram transfer apparatus 4 writes the traffic information every transfer path (P) into a multi-path table so as to sequentially update the written traffic information.

Figure 9:
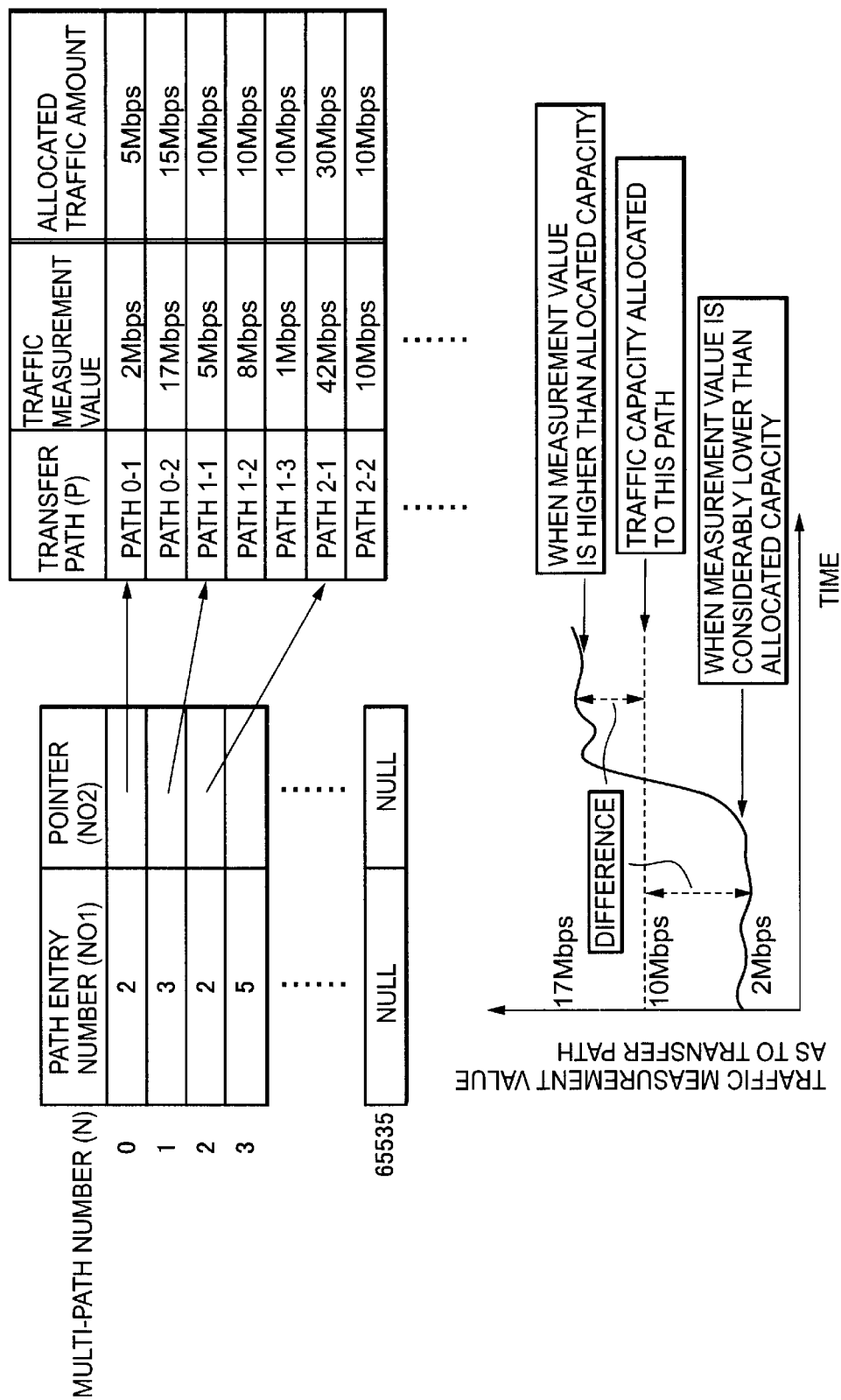
FIG. 9 is a structural example of a multi-path table in the second embodiment of the present invention.

FIG. 9 is a structural example of a multi-path table used in the second embodiment of the present invention.

In accordance with the second embodiment, in the multi-path table, as shown in FIG. 9, a plurality of path information is stored whose number is equal to a total number of path entries corresponding to each of the multi-paths. This path information is constituted by transfer path information (P) required when data is transferred, a traffic measurement value of each of the paths, and a traffic capacity allocated to each of the transfer paths.

Then, when a transfer destination of a newly received IP datagram is determined, the multi-path table for reflecting thereon this traffic information is read; a selection is made of such a transfer path having the largest empty traffic capacity among the transfer paths which have been entered with respect to this multi-path number; and thus, the desirable transfer path is determined.

As previously explained, since the transfer path (P) is determined by employing the actually measured traffic information, the datagram can be properly transferred in response to the required traffic capacity.

In other words, in this second embodiment, the traffic information is stored/written as the attribute as to the transfer path of he multi-path table 130. Also, the traffic information which is arbitrarily measured as to each of the transfer paths is arbitrarily updated.

Then, when the desirable transfer path is determined, while referring to the information contained in the multi-path table, a selection is made of such a transfer path having the lowest congestion degree (namely largest empty capacity) with respect to the transfer path constituting the subject, and then this selected transfer path is determined as the desirable transfer path. As a consequence, while the traffic amounts among the plural paths registered as the multi-path are averaged, the desirable transfer destination can be determined.

For instance, in the example shown in FIG. 9, it is now assumed that as the transfer paths entered in the multi-path number (1), there are three paths of 1-1; 1-2; 1-3, and the traffic capacity allocated to each of these transfer paths is 10 Mbps. In the case that a transfer path of a newly collected flow is determined, the path selecting process unit 13 acquires as plural path information (PP), the multi-path 1-1; path 1-2, path 1-3; the respective traffic measurement values; and the traffic capacities allocated thereto. The path selecting process unit 13 compares a traffic capacity allocated to this transfer path with the plural path information (PP) among these transfer path subjects, and then selects the path 1-3 as a transfer path of an IP datagram belonging to this collected flow. This path 1-3 corresponds to such a path having the largest empty capacity.

Also, as to a transfer path under such a congestion state that a traffic measurement value of this transfer path which constitutes a transfer path subject exceeds an allocation capacity, the path selecting process unit 13 does not select this transfer path as the transfer path of the newly collected flow until the congestion state can be improved.

Then, the transfer path selected at this time is registered into the collected flow table with respect to this multi-path.

Third Data Transfer Apparatus

Next, a data transfer apparatus, according to a third embodiment of the present invention, will now be described.

The third embodiment is featured by such that as to a multi-path table to be referred, the first embodiment is combined with the second embodiment. In other words, normally, in accordance with the executing method of the multi-path table employed in the first embodiment, the path selecting process operation 11 determines the respective transfer paths in a constant order based upon a predetermined transfer ratio. However, in such a case that a traffic amount measured as to a transfer path contained in this multi-path is considerably large, the path selecting process unit 11 excludes setting of this transfer path, and sets such a transfer path which is subsequently selected.

That is to say, when the path selecting process unit 13 determines a basic transfer path (P), this path selecting process unit 13 allocates the transfer paths to the respective collected flows (SF) whose transfer destinations should be newly determined in a predetermined sequence in accordance with the first embodiment. In such a judgement case that a measured traffic amount of a certain transfer path (P) is considerably smaller than the set traffic amount, this transfer path (P) is selected irrespective of the sequence of this transfer path (P). To the contrary, in such a judgement case that a measured traffic amount of a certain transfer path (P) is considerably larger than the set traffic capacity, the path selecting process unit 11 does not select this transfer path (P) even when the sequence of this transfer path (P) is effective, but selects another transfer path (P) of the next sequence.

Fourth Data Transfer Apparatus

Next, a data transfer apparatus, according to a fourth embodiment of the present invention, will now be explained.

In this fourth embodiment, only a collected flow table is read in order that a transfer destination is determined as to a received datagram related to a multi-path.

In other words, in this fourth embodiment, while a multi-path table is not separately provided, all of transfer information which constitutes a multi-path is previously registered into a collected flow table in response to transfer rates thereof to thereby constitute collected flows. As a result, a desirable transfer path is determined with reference only to such a collected flow table. The collected flow table is determined by a combination between a multi-path number and flow discrimination information.

Figure 10:
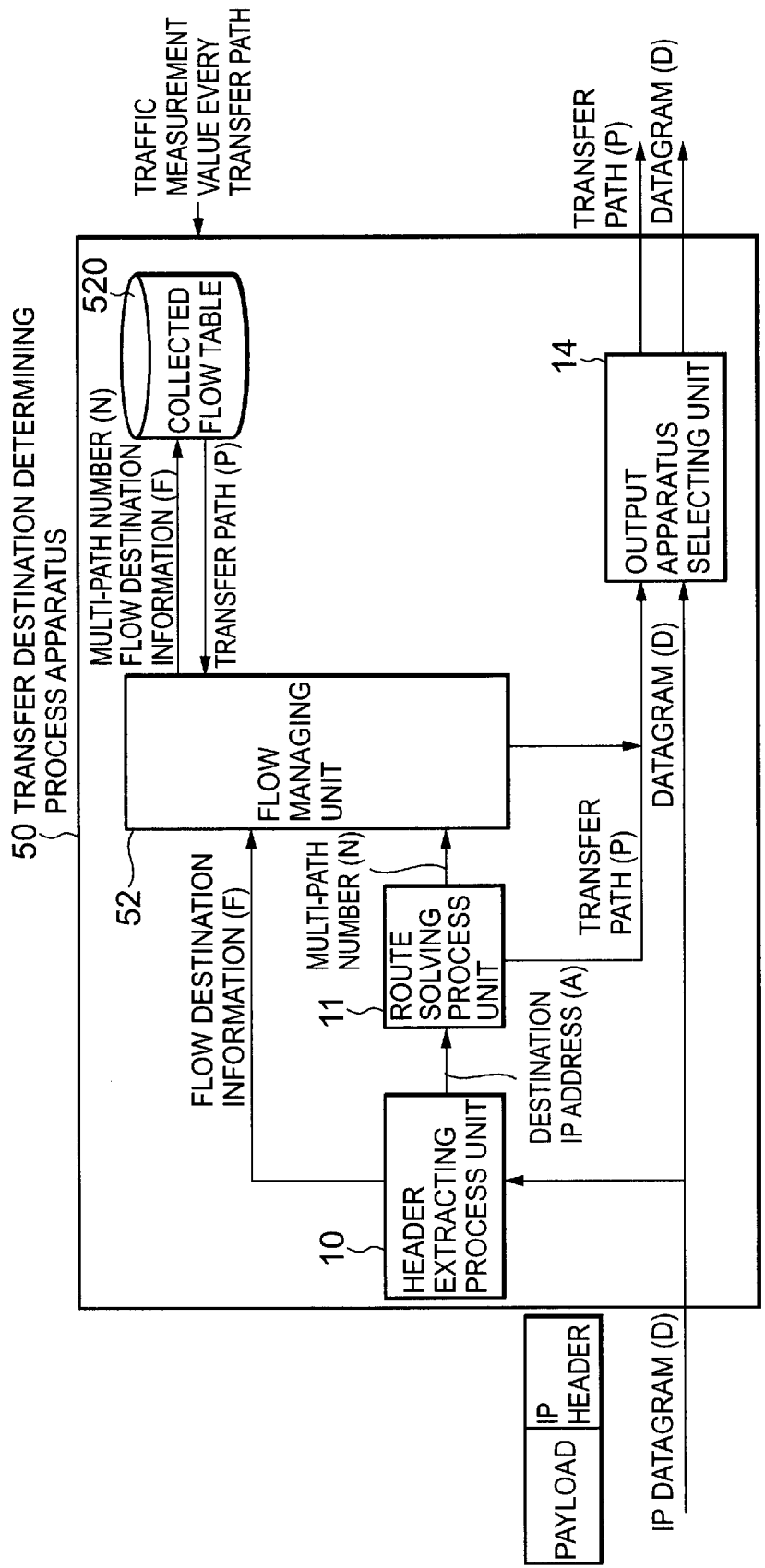
FIG. 10 is a schematic block diagram for representing a structural example of a communication destination determining process apparatus in a fourth embodiment of the present invention.
Figure 12:
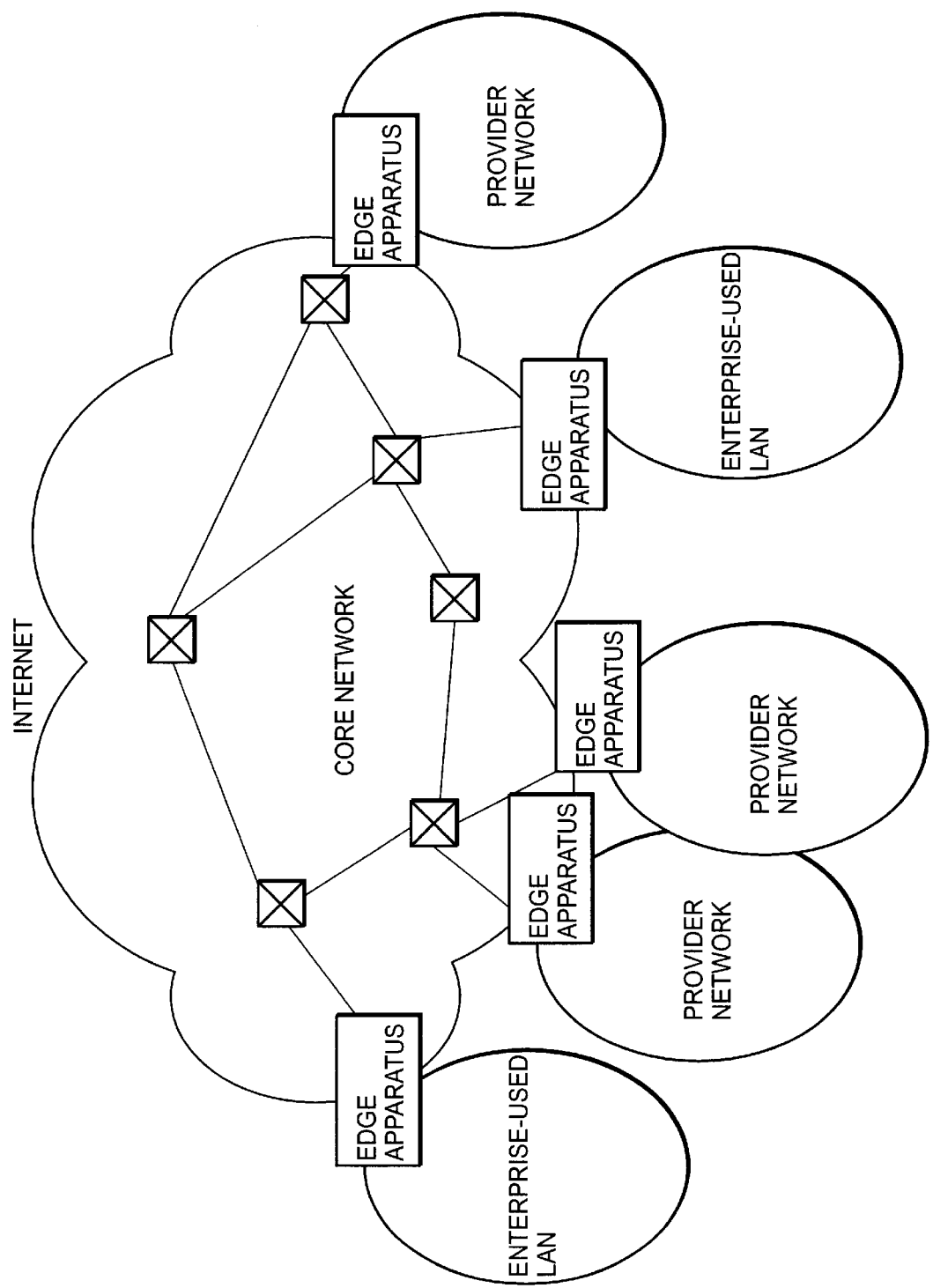
FIG. 12 is a schematic block diagram for indicating a structure of a broad-range Internet network.

FIG. 10 is a block diagram for representing an arrangement of a communication destination determining process apparatus 50, according to the fourth embodiment of the present invention.

The communication destination determining process apparatus 50, according to the fourth embodiment, is arranged by a header extracting process unit 10, a route solving process unit 11, a flow managing unit 52, an output apparatus selecting unit 14, and a collected flow table 520.

A difference between this fourth embodiment and the previously explained embodiment shown in FIG. 3 is such that neither the multi-path table 130, nor the path selecting process unit 13 is employed.

It should be noted that since the header extracting process unit 10, the route solving process unit 11, and the output apparatus selecting unit 14 in the arrangement of FIG. 10 own the same functions as those of the communication destination determining process apparatus 1, detailed explanations thereof are omitted.

When both flow discrimination information and a destination IP address are extracted as to a received IP datagram in FIG. 10, in such a case that the transfer destination as to this IP datagram is set as the multi-path, the flow managing unit 52 determines a transfer path (P) with reference only to the collected flow table 520 if both the multi-path number (N) and the flow discrimination information (F) are inputted.

FIG. 11 represents a structural example of the collected flow table 520. In this collected flow table 520, the path information has been previously written in correspondence with such a ratio required to perform the load distribution with respect to each of the multi-path numbers.

It is now assumed that, for instance, as to a route whose multi-path number (N) is equal to 1, the received IP datagram should be transferred while maintaining the ratio of 2:1, namely the ratio of path 1-1 to path 1-2 as the transfer path (P).

In this case, all of the data areas for the multi-path number 1 of the collected flow table 520 are written by the paths in this order of the path 1-1; the path 1-1; and the path 1-2, so that the transfer path (P) can be determined with respect to all of the flows.

Since the path selecting process unit 13 is not required in this fourth embodiment, the circuit scale of the transfer destination determining apparatus 1 and the memory capacity can be reduced, as compared with those of the first embodiment and the second embodiment.

Similar to the second embodiment, while the traffic amount of the IP datagram is measured every transfer path (P) in this fourth embodiment, when it is so detected that a measured traffic amount of a certain transfer path (P-10) is larger than a set traffic amount, several portions of this transfer path (P-10) contained in the collected flow table 520 with respect to this multi-path are changed into other transfer paths. Conversely, when it is so detected that a measured traffic amount of a certain transfer path (P-11) is smaller than the set traffic amount, in the collected flow table 520, said transfer path are changed for use for another multi-path. As a result, the load distribution can be more correctly realized.

Then, although not shown in the drawing, the information of the collected flow table 520 is updated by the control unit for controlling the circuit elements within the transfer destination determining process apparatus 50.

Fifth Datagram Transfer Apparatus

Subsequently, a data transfer apparatus according to a fifth embodiment of the present invention will now be described.

This fifth embodiment is related to the above-described data transfer apparatus as defined in the first to fourth embodiments, in which the layer 3 is the IPv4.

In other words, different from the IPv6, such a field used to discriminate a flow such as a flow label is not provided in the header information of the layer 3 in the IPv4.

As a result, it is required to refer to other information than the IP header information in order that a group of data having a sort of specific data is identified and a specific flow is discriminated during operation.

In this fifth embodiment, as the flow discrimination information in the IPv4, the datagram transfer apparatus refers to the header information of the layer 4 as flow discrimination information (F) of a received datagram. In the arrangement of this fifth embodiment, the protocol terminating apparatus of the datagram transfer apparatus terminates the layers lower than, or equal to the layer 4.

For instance, when the layer 4 is TCP, a concrete example will now be explained.

That is, it is such a method for utilizing both lower-graded 2 bits of a transmission source port number contained in the TCP header and lower-graded 6 bits of a transmission source IP address contained in the IPv4 header.

As previously explained with reference to the first to fifth embodiments, the present invention can be applied to all of the datagram transfer operations having such a "flow" concept. Then, in this case, all of such information used to uniquely discriminate the desirable flow is not used as the flow discrimination information (F), but the transfer path is determined every such a flow defined by collecting only a portion of the information used to uniquely discriminate the desirable flow as the flow discrimination information (F). As a consequence, the present invention can be applied to even such a datagram transfer apparatus having a core network where a large number of flows are produced.

In other words, in accordance with the present invention, in the case of such a single path, namely a transfer path is uniquely determined from a destination address as to a received IP datagram, a datagram transmission is carried out to this single transfer path. In the case of such a multi-path, namely a plurality of routes may be used, a transfer path is instantaneously determined to output both this IP datagram and the transfer path information by the following manner. That is, the discrimination information which is previously set during operation of this multi-path is read out, and furthermore, as to a combination between this multi-path discrimination information and flow discrimination information read in connection with this multi-path discrimination information, the datagram transfer apparatus refers to the collected flow table for previously setting/storing thereinto the transfer paths through which the datagrams should be transferred.

Also, in such a case that the relevant multi-path number and the transfer path corresponding to the flow discrimination information are not yet registered into the immediately referable collected flow table, the datagram transfer apparatus owns the function capable of selecting an optimum transfer path with reference to a multi-path table containing a list of all transfer paths. These all transfer paths are set and registered as the multi-paths so as to transmit datagrams to a plurality of routes. Then, the transfer path in the multi-path table, which has been once judged as the optimum transfer path is registered into the collected flow table. As a consequence, when such a IP datagram having the same address and the same flow discrimination information is subsequently received, the datagram transfer apparatus can execute the transfer process operation in a high speed with reference to this collected flow table.

In other words, it is now assumed that as to the combinations between the multi-path numbers and the flow discrimination information, a single transfer path which can be judged as a presently optimum transfer path is saved in the collected flow table.

As described above, since the datagram transfer apparatus is provided with the immediately-referable collected flow table and the multi-path table used to judge the optimum path as to the plural paths, there is an effect that the transfer destination of the data can be effectively determined.

The communication destination determining process apparatus, in the present invention, determines either the transfer destination or the route for the transfer destination in the unit of a certain amount of collected flows by utilizing only a portion of the information capable of discriminating the flow contained in the header of the datagram. As a consequence, the process operation for determining the transfer destination every flow can be made simple, and also the memory capacity can be reduced.

In accordance with the communication determining process operation of the present invention, in the table for causing the flows to be related to the transfer destination routes, the information about the routes with respect to all of these flows is no longer stored, but the transfer destination route is merely stored every collected flow which is determined by a portion of the information capable of discriminating the above-explained flow. As a result, the necessary memory capacity can be decreased.

Also, since the information for determining the collected flow may be made of a continuous bit stream, while this information for determining the collected flow is utilized as a portion of an address, the information of the transfer destination route is stored in the data area. As a result, it is possible to easily determine the transfer destination path from the information used to determine the collected flow.

The present invention owns a first effect that a large amount of memory capacity used to causing the flows to be made in correspondence with the transfer destinations is no longer required. This is because the transfer destination is determined with respect to each of the collected flow, and is registered into the table. This collected flow is defined by a portion of the information for uniquely discriminating an optimum flow.

The present invention owns a second effect that the calculating process used to causing the flows to be made in correspondence with the transfer destinations can be carried out in high speeds. This is because the flow discrimination information (F) corresponding to a portion of the information for uniquely discriminating an optimum flow is made in correspondence with the lower-graded bits of the stored address of the transfer destination. As a consequence, it is possible to form the table by which the transfer destinations can be easily calculated.

What is claimed is:

1. A transfer destination determining apparatus in a communication network, which manages a received datagram as a collected flow with grouping information identified with the datagram, determining a transfer path wherein a plurality of transfer paths corresponding to each of said collected flows are provided for distributing traffic, wherein the communication network comprises:
subscriber networks, and
a core network comprising:
an edge apparatus for connecting the subscriber networks with said core network, and
a repeating apparatus for transferring the data through the core network,
wherein IP datagrams from a pre-staged apparatus, are managed as a collected flow with the grouping information identical to the address information contained in the IP datagram, and a transfer path is to be determined from the plurality of transfer paths distributed to a post staged apparatus corresponding to each of said collected flows, and wherein the plurality of transfer paths in the core network are managed with a path identifier applied to a combination of source and destination addresses in the edge apparatus, and wherein the transfer path is determined based upon the flow discrimination information and address information attached to the IP datagram so as to perform Internet communication; and wherein said transfer destination determining apparatus further comprises:

a header information extracting part for extracting both address information and flow discrimination information, which are contained in header information of said IP datagram received from a pre-staged apparatus;

a route solving part operated in such a manner that when said address information is received and then a single path transfer for uniquely determining a transfer destination is defined from said address information, outputs a transfer path to a post-staged apparatus; whereas when said address information is received and then a multi-path transfer for not uniquely determining a transfer destination but having a plurality of transfer destination subjects is defined from said address information, outputs a multi-path number which is uniquely determined from the address information; and collected flow managing part for inputting thereinto both the flow discrimination information extracted by said header information extracting part and the multi-path number outputted from said route solving part so as to determine a transfer path corresponding to a collected flow determined by both said multi-path number and said flow discrimination information.

2. A transfer destination determining process apparatus as claimed in claim 1 wherein:

said transfer destination determining apparatus determines a transfer path from a collected flow table which stores thereinto such transfer paths corresponding to the respective collected flows determined from the received address information and the extracted flow discrimination information; in the case that another collected flow which is not registered in said collected flow table is discriminated, said transfer destination determining process apparatus determines a transfer path with respect to said collected flow by referring to a multi-path table which has previously stored thereinto all of multi-paths, all of transfer path information belonging to each of said multi-paths, and all of attributes belonging to each of said multi-paths; and said transfer destination determining process apparatus newly adds information of said determined collected flow to said collected flow table so as to register said information into the collected flow table.

3. A transfer destination determining process apparatus as claimed in claim 2 also comprising a collected flow table which stores thereinto such transfer paths corresponding to the respective collected flows determined from the received address information and the extracted flow discrimination information.

4. A transfer destination determining process apparatus as claimed in claim 2, in the case that another collected flow which is not registered in said collected flow table is discriminated, said transfer destination determining process apparatus determines a transfer path with respect to said collected flow by referring to a multi-path table which has previously stored thereinto all of multi-paths, all of transfer path information belonging to each of said multi-paths, and all of attributes belonging to each of said multi-paths; and said transfer destination determining process apparatus newly adds information of said determined collected flow to said collected flow table so as to register said information into the collected flow table.

5. A transfer destination determining process apparatus as claimed in claim 4 wherein:

said collected flow table of said transfer destination determining apparatus deletes therefrom the registered information of the collected flow, which has not been used as the transfer path for a predetermined time period.

6. A transfer destination determining process apparatus as claimed in claim 1 wherein:

said collected flow managing part includes path selecting process part for determining a transfer path in response to each of the attributes of said plural transfer paths which have been set/registered into said multi-path table with respect to each of multi-path numbers.

7. A transfer destination determining process apparatus as claimed in claim 6 wherein:

the attributes of said transfer path are equal to transfer rates of the respective transfer paths which have been previously set.

8. A transfer destination determining process apparatus as claimed in claim 6 wherein:

the attributes of said transfer paths are equal to traffic measurement values as to the respective transfer paths.

9. A transfer destination determining process apparatus as claimed in claim 1 wherein:

said collected flow managing part includes a collected flow table into which the collected flows determined based upon both the receiving address information and the extracted flow discrimination information are stored as all of the multi-paths and all of the transfer path information belonging to the respective multi-paths; and said collected flow managing part stores into said collected flow table, the collected flow which is determined based on a multi-path number and each of the flow discrimination information in response to a setting ratio of transfer paths and also a predetermined transfer ratio, and determines a transfer path with respect to the collected flow.

10. A transfer destination determining method in a communication network by a protocol terminating apparatus for terminating the received address information and the extracted flow protocol of a received IP datagram and having a function for transmitting the IP datagram to a predetermined transfer destination; and a transfer destination determining apparatus for determining said received IP datagram, said transfer destination determining method comprising step of extracting both flow discrimination information and address information from a header of the received IP datagram;

extracting step of extracting a multi-path number from said extracted address information;

flow managing step of reading information with respect to a collected flow from said multi-path number and said flow discrimination information;

determining step of determining a transfer path with reference to a collected flow table for storing thereinto transfer paths related to collected flows and said collected flow table; and transferring step of transferring said datagram to a protocol terminating apparatus for executing a transmission based upon the determined transfer path information;

said collected flow table stores thereinto collected flows which are determined based upon the multi-path numbers and the respective flow discrimination information in response to a setting ratio of transfer paths and also a predetermined, transfer ratio; and said transfer destination determining process apparatus owns a function for determining a transfer destination route of a collected flow by referring to said collected flow table.

11. A transfer destination determining method as claimed in claim wherein:

in a datagram transfer apparatus arranged by a protocol terminating apparatus for terminating a protocol of a received IP datagram and having a function for transmitting the IP datagram to a predetermined transfer destination; and a transfer destination determining apparatus for determining said received IP datagram, said transfer destination determining method is comprised of:

extracting step of both flow discrimination information and address information from a header of the received IP datagram;

extracting step for extracting a multi-path number from said extracted address information;

flow managing step of reading information with respect to a collected flow from said multi-path number and said flow discrimination information;

determining step of determining a transfer path with reference to a collected flow table for storing thereinto transfer paths related to collected flows and said collected flow table; and transferring step of transferring said datagram to a protocol terminating apparatus for executing a transmission based upon the determined transfer path information; and said collected flow table owns means for storin thereinto collected flows which are determined based upon the multi-path numbers and the respective flow discrimination information in response to a setting ratio of transfer paths and also a predetermined transfer ratio; and also a function for monitoring a traffic capacity every transfer path, and for determining a transfer destination route in response to a difference between the monitored traffic capacity and a traffic capacity of each of the transfer destination routes when a transfer destination of the received IP datagram is determined.

* * * * *